(No Model.)
F. G. MYERS.
ANTI-FRICTIONAL BEARING FOR SHAFTS.
No. 403,854. Patented May 21 1889.
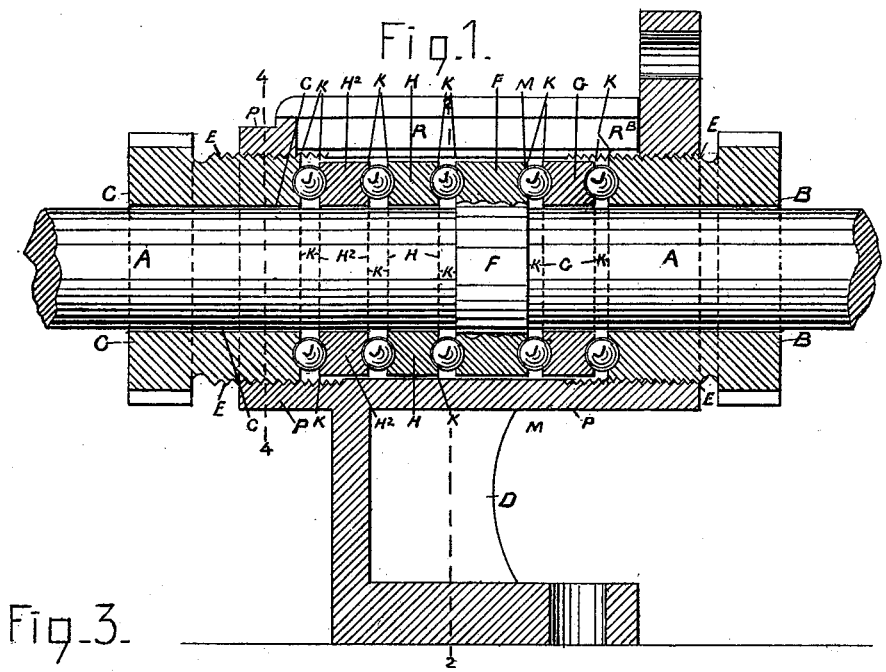
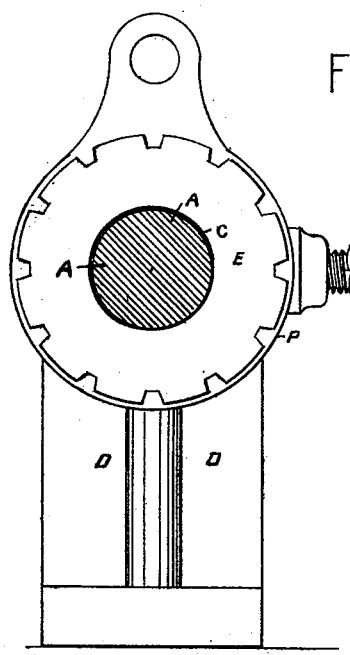
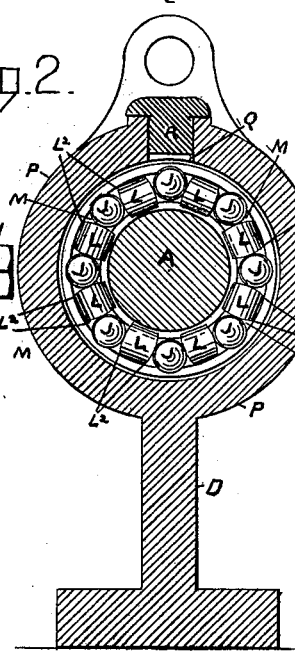
WITNESSES
Frances M. Brown
Molina G. Kelly
INVENTOR.
Frederick G. Myers
by his Attorneys
Brown Bros.

UNITED STATES PATENT OFFICE.

FREDERICK GEORGE MYERS, OF WINTHROP, ASSIGNOR OF ONE-HALF TO WELLINGTON F. SMART, OF BOSTON, MASSACHUSETTS.

ANTI-FRICTIONAL BEARING FOR SHAFTS.

SPECIFICATION forming part of Letters Patent No. 403,854, dated May 21, 1889.

Application filed June 21, 1888. Serial No. 277,752. (No model.)

*To all whom it may concern:*

Be it known that I, FREDERICK GEORGE MYERS, of the town of Winthrop, in the county of Suffolk and State of Massachusetts, have invented certain new and useful Improvements in Anti-Frictional Bearings for Shafts, Axles, &c., of which the following is a full, clear, and exact description.

This invention particularly pertains to means for the resistance of the lengthwise thrusts or movements of shafts, axles, &c.; and its object is to enable the frictional resistance of the bearings of the shaft therefor to be reduced to the minimum.

To this end the invention consists of a fixed collar on the shaft, &c., between its opposite end bearings, in combination with a collar or collars between either or both of said end bearings and said fixed collar, and loose on the shaft, and balls or such like located between said collars and said opposite end bearings, and in the resistance of lengthwise thrusts or movements of the shaft, &c., to make rolling bearings for said collars as to each other and said end bearings, and thereby to reduce the frictional contact thereof, all substantially as hereinafter described.

In the drawings forming part of this specification, Figure 1 is a central longitudinal vertical section. Fig. 2 is a transverse vertical section, line 2 2, Fig. 1. Fig. 3 is an end view. Fig. 4 is a transverse vertical section, line 4 4, Fig. 1.

In the drawings, A is a shaft having bearings B C at its opposite end portions of a common stand or frame, D. Each bearing B C consists of a male screw-threaded sleeve, E, screwing into correspondingly female screw-threaded bores of the stand D.

F is a collar on the shaft A between its opposite end bearings, B C. This collar F may be either integral with or fixed in any suitable manner rigidly on and it rotates with the shaft.

G and H $H^2$ are three collars, each loose on the shaft A and located between the fixed collar F and the opposite end bearings, B C, of the shaft, and the loose collar G is between the fixed collar and end bearing B and the loose collars H $H^2$ between the fixed collar and end bearing C.

J J are a series of balls between the opposed faces K of the several collars F G H $H^2$ and the end bearings, B C, and L L are cylindrical blocks, with convexed or rounded heads or ends $L^2$, separating the balls J J from each other, and severally loose and received in grooves M, of corresponding circular shape in cross-section and extending around each of the opposed faces K of said collars and end bearings.

In the rotation of the shaft A its lengthwise movements or thrusts are resisted by the end bearing B or C, as the case may be, and, according as such movement is in either one or the other direction, working thereon through the fixed collar F of the shaft, the loose collar or collars G or H $H^2$, as the case may be, and the intervening balls, J J, the whole acting to reduce the frictional resistance of the end bearings to the thrusts of the shaft, and in a manner substantially as follows:

The pressure of the thrust of the shaft A in either direction is imparted to the end bearing of the shaft in the line of direction of the thrust and through the fixed and loose collars and balls J J, preferably separated, as stated, and the rotation of the loose collar or collars, as the case may be, is at a reduced speed from that of the shaft and its fixed collar, and is produced by the rolling of the balls in contact with them, the whole resulting in reduced friction on the end bearing to the thrust of the shaft, and the extent of this reduction will, as is obvious, be greater or less, according as a greater or less number of loose collars and intervening balls are used between the fixed collar and the end bearing of the shaft. The separating-blocks for the balls may be dispensed with, and while, for obvious reasons, it is preferable to use them, yet the balls may be left loose and free to roll in contact with each other.

The described construction of the end bearings, B C, enables the bearings and balls and loose collars to be set up as may be desired, and once adjusted they are made fast by setscrews N bearing against inserted and movable blocks O, forming part of the screw-threaded sleeves, or in any other well-known manner, and all of which forms no part of this invention.

In the use of this invention for propeller-shafts of steamships, as the thrust of the shaft is the greater in the forward movement of the ship, it is best to provide the shaft with a greater number of loose collars separated by balls, all as described, and its portion between its fixed collar and the end bearing of the shaft, to receive the thrust of the shaft in that direction, than at its portion between its fixed collar and the opposite end bearing. However, the invention is not limited to any number of loose collars or balls or such like between them and fixed collar and end bearings, nor to the arrangement of a loose collar or collars between both end bearings and the fixed collar. The balls or such like may be dispensed with between a loose collar and an end bearing; but, for obvious reasons, it is preferable to use them.

As particularly shown, a fixed collar and the several loose collars, intervening balls, and separating-blocks for the balls, all as described, are inclosed in a shell or casing, P, forming part of the frame or stand D, and this casing has an elongated opening or slot, Q, along its upper side, closed by an inserted but readily-removable stopper, R, for convenience in oiling said several parts.

Having thus described my invention, what I claim, and desire to secure by Letters Patent, is—

The combination, with a shaft and stationary end bearings therefor, of a fixed and of loose collars on the shaft, having grooves or ways K in their opposite faces severally concentric with the shaft, loose balls J, located between and rolling in the grooves of said collars, and loose blocks L, placed between and separating the balls, substantially as described, for the purposes specified.

In testimony whereof I have hereunto set my hand in the presence of two subscribing witnesses.

FREDERICK GEORGE MYERS.

Witnesses:
ALBERT W. BROWN,
WELLINGTON F. SMART.